April 11, 1961 C. W. DUNNET 2,978,809
BUTTER PAT SLICER

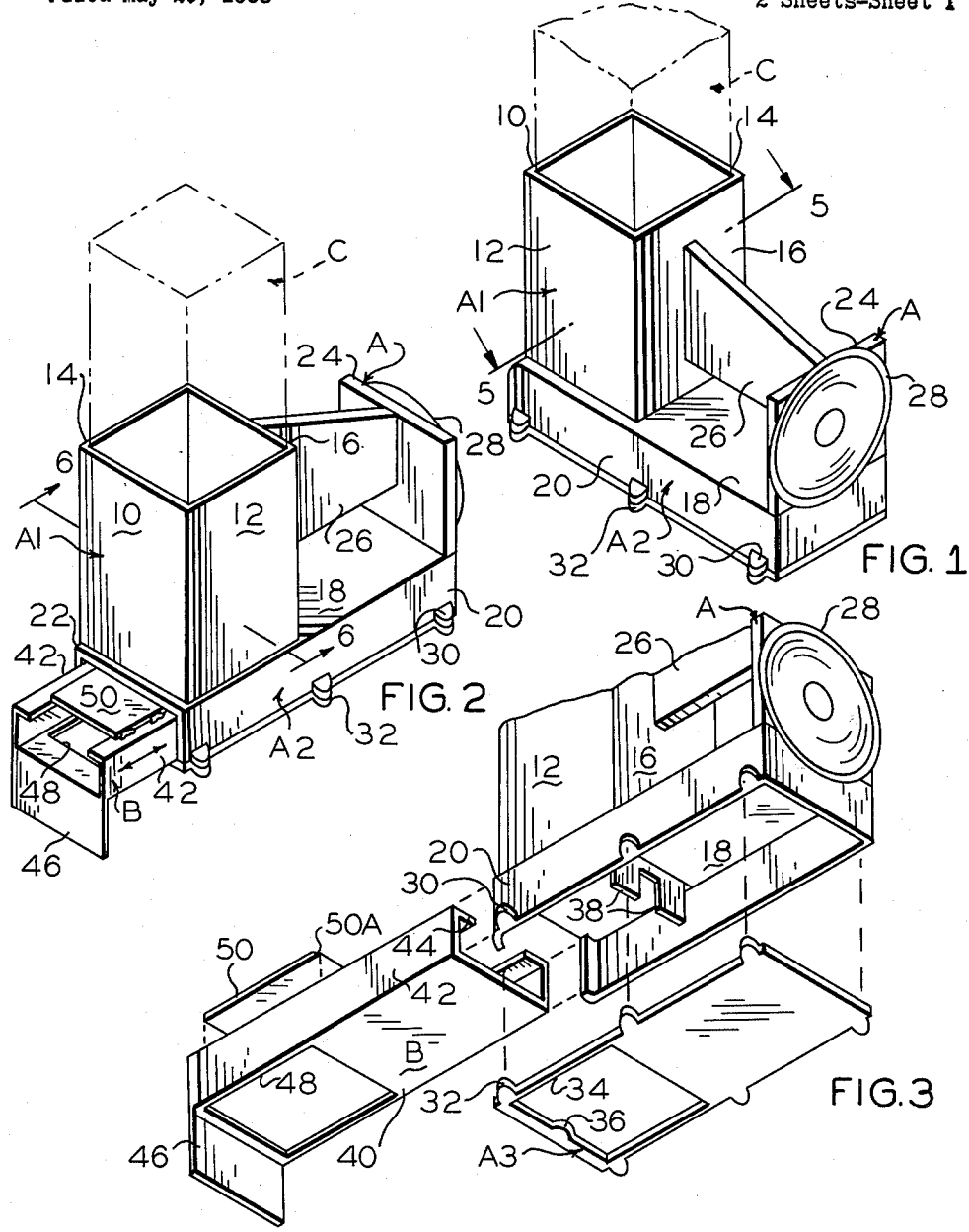

Filed May 29, 1958 2 Sheets-Sheet 2

INVENTOR.
CHARLES W. DUNNET

BY
ATTORNEYS

United States Patent Office 2,978,809
Patented Apr. 11, 1961

2,978,809

BUTTER PAT SLICER

Charles W. Dunnet, 1525 N. American St., Philadelphia, Pa.

Filed May 29, 1958, Ser. No. 738,789

3 Claims. (Cl. 31—21)

My invention relates to a butter patty slicer, and more particularly relates to a hand operated butter patty slicer and holder wherein a one-quarter pound cake of butter may be stored therein and a plurality of individual butter patties sliced therefrom rapidly and efficiently without being touched by a person's hands.

In the setting of a table at home, it is frequently desirable for the housewife to serve individual butter patties rather than the large one-quarter or full pound butter cakes. This practice is not only hygienic but also economical since it avoids the necessity of serving appreciable quantities of butter in excess of the needs of the family. However, it is well recognized that a housewife experiences considerable difficulty in cutting by hand by means of a knife individual butter patties which are uniform in thickness and contour and wherein the touching of the butter itself by the hands is avoided.

Therefore, an object of my invention is to construct a butter patty dispenser which will provide sanitary service of individual butter patties cut therein.

Another object of my invention is to provide a butter patty slicer wherein a one-quarter pound cake of butter may be stored therein within a refrigerator and wherein the butter cake may be cut into a succession of uniform patties and dispensed therefrom individually.

Another object of my invention is to provide a butter patty slicer for discharging individual patties upon a plate without the necessity of the housewife touching the butter.

Another object of my invention is to provide a butter patty slicer whereby the butter cake may be stored therein during refrigeration and thereafter dispensed sanitarily even by a child.

Another object of my invention is to provide a butter patty slicer for holding a one-quarter pound cake of butter and cut therefrom individual uniform patties whenever desired.

Other objects of my invention are to provide an improved device of the character described, that is easily and economically produced, which is sturdy in construction, and which is highly efficient in operation.

With the above and related objects in view, my invention consists in the details of construction and combination of parts, as will be more fully understood from the following description, when read in conjunction with the accompanying drawing, in which:

Fig. 1 is a perspective view of a butter patty slicer embodying my invention.

Fig. 2 is a front perspective view thereof showing the slicer drawer in open position.

Fig. 3 is an exploded view of the butter patty slicer.

Referring now in greater detail to the drawing, in which similar reference characters refer to similar parts, I show a butter patty slicer comprising a housing, generally designated as A, and a slicer drawer, generally designated as B, slidable therein.

Figure 4:
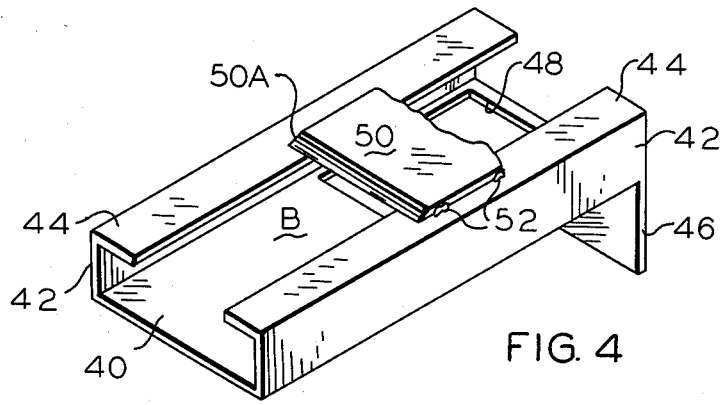
Fig. 4 is a perspective view of the slicer drawer.

The housing A is an integrally molded plastic assembly comprising a hollow rectangular chimney A1 which extends upwardly from a chamber portion A2, longitudinally extending at right angles thereto and communicating therewith. The chimney A1 has walls 10, 12, 14 and 16 defining therebetween a receptacle into which a one-quarter pound cake of butter C may be stored. The chamber portion A2 has a roof 18 which is apertured to receive the chimney A1 and has longitudinally extending side walls 20 and 22 extending downwardly from the roof. A plate 24 extends upwardly from one end of the chamber portion A2 and is joined to the chimney A1 by a reinforcing rib 26 extending therebetween and joined to the roof 18. A suction cup 28 is cemented to the face of the plate 24 by suitable material such as shellac in order that the entire butter patty slicer may be mounted upon a wall for convenience.

As shown in Fig. 3, a plurality of circumferentially spaced ears 30 extend outwardly from the lower portion of the chamber A2 along the side walls 20 and 22 and are adapted to have secured therein a base member A3. The base plate A3 is of substantial rectangular configuration and is preferably of stainless steel metal construction. A plurality of gears 32 are formed at the periphery of the plate A3 and register with the ears 30 in the chamber portion A2 in order to enclose the bottom of the chamber. A rectangular aperture 34 is formed in the base plate A3 and is of a configuration such as to permit a butter patty to pass freely therethrough. A die cut lip 36 extends upwardly from the base plate A3 immediately adjacent one side of the aperture 34. The lip 36 is the only upward projection from the flat base plate A3 and is adapted to engage upon the slicing drawer B to prevent its complete withdrawal from the chamber portion A2 as will be more fully described hereinafter. Suitable screws or rivets secure the base plate A3 to the bottom of the chamber portion A2 by passing through apertures in the respective ears 30 and 32. It is also to be observed that a pair of stops 38 extend downwardly from the roof 18 of the chamber A2 co-planar with the back wall 16 of the chimney A1. The ends of the stops 38 are spaced respectively and interiorly from the side walls 20 and 22 to permit passage therebetween in the said space for the slicer drawer B. When the base plate A3 is secured to the bottom of the chamber A2, the bottom edge of the stops are immediately adjacent the top surface of the plate A3.

The slicer drawer B comprises a stainless steel rectangular pan 40 having longitudinally upturned edges 42 with inwardly turned flanges 44 all integrally formed from a single sheet metal stamping. The configuration of the slicer drawer B is complementary with the interior of the chamber portion A2 and is slidable therein by finger pressure exerted upon a downwardly formed lip 46 at one edge of the pan 40 which serves as a handle. An aperture 48 of rectanagular configuration is formed in the pan 40 and is adapted to register with the aperture 34 in the base plate A3 when the pan is in closed position. A stainless steel blade 50 having a honed edge 50A is secured upon the flange surfaces 44 at each side thereof by suitable spot welding 52.

Figure 5:
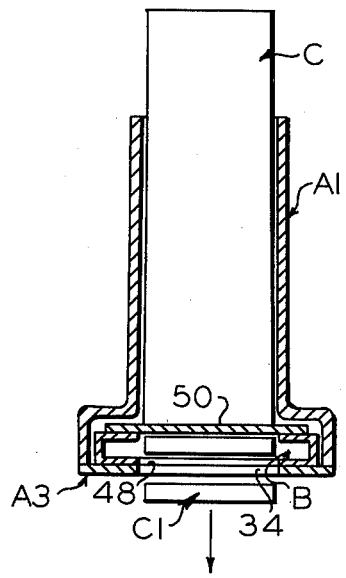
Fig. 5 is a sectional view taken along lines 5—5 of Fig. 1.
Figure 6:
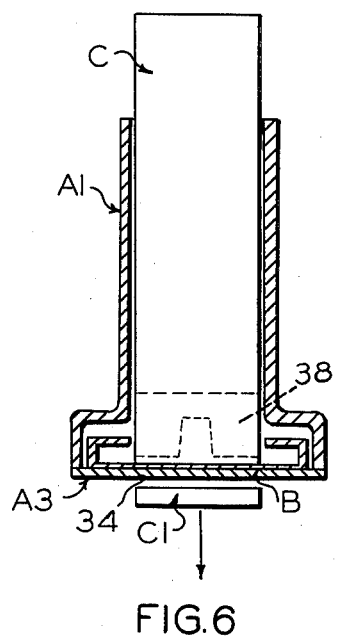
Fig. 6 is a sectional view taken along lines 6—6 of Fig. 2.

As is apparent from the foregoing description, my invention operates as follows:

When the slicer drawer B is in closed position, as shown in Figs. 1 and 5, the cake of butter C placed within the chimney will rest by gravity upon the upper surface of the blade 50. In order to slice a patty from the cake C, the slicer drawer B is pulled outwardly from the chamber A2 by drawing upon the downwardly extending lip or handle 46. The butter cake C will then fall by gravity upon the upper surface of the forward portion of the pan 40. Urging the slicing drawer B inwardly will cause the knife blade 50 to cut through the cake of butter C and sever a patty C1 therefrom. See Figs. 2 and 6. As the slicer drawer B is pressed longitudinally through the chamber A2, the butter patty C1 will abut against the downwardly extending stops 38 and slide backwardly upon the pan 40 until the patty C1 reaches the aperture 48 therein. Since the entire housing A is mounted upon a wall of a room, the patty C1 recently severed will fall through the aperture 48 in the slicer drawer B and fall through the aperture 34 in the base plate A3 whereupon it may be caught in a tray or plate. It is further to be observed that the drawer B is prevented from complete removal from the chamber A2 because of the lip 36 engaging the forward portion of the aperture 48 when the drawer B is in the outward position. It is further to be noted that the downwardly extending stops 38 freely pass between the edges of the flanges 44 and wipe the recently cut butter patty C1 across the surface of the pan 40 into the aperture 48 during forward sliding of the drawer B.

It is easily seen that neither the butter cake C nor the patty C1 ever need to be touched by the hands. Furthermore, the butter cake may be stored within the chimney A1 and kept under refrigeration therein. Should it be desired at any time to clean the butter patty slicer, it is merely necessary to remove the base plate A3 whereupon the drawer B may be easily removed.

Although my invention has been described in considerable detail, such description is intended as being illustrative, rather than limiting, since the invention may be variously embodied, and the scope of the invention is to be determined as claimed.

I claim:
1. A butter pat slicer comprising an enclosure having top, bottom and side walls, said top and bottom walls being aligned, pat-receiving openings therein, a butter slab container on said top wall in register with the opening in said top wall, a drawer in said enclosure, said drawer having side and bottom walls, said bottom wall having a pat-receiving opening in register with said pat-receviing openings in said enclosure, a cutter plate having a cutting edge on the top of the side walls of said drawer above said pat-receiving opening, and a stop member in said enclosure depending from the top wall thereof while being substantially co-planar with a side of said opening in said top wall and spaced inwardly from the side walls thereof, and substantially in contact with said cutting edge when the drawer is in closed position.

2. The device of claim 1 wherein said drawer is provided with a plate depending from one end thereof, said plate being positioned outwardly of said enclosure when said drawer is in closed position and forming a handle for said drawer.

3. The device of claim 1 wherein the top wall of said enclosure is provided with an upstanding wall at one end thereof, said upstanding wall having a suction cup mounted on one face thereof and a reinforcing rib extending between said container and said upstanding plate.

References Cited in the file of this patent
UNITED STATES PATENTS

| | | |
|---|---|---|
| 1,197,200 | Giles | Sept. 5, 1916 |
| 1,334,304 | Hodgson et al. | Mar. 23, 1920 |
| 2,174,772 | Berg | Oct. 3, 1939 |
| 2,613,714 | Miller | Oct. 14, 1952 |

FOREIGN PATENTS

| | | |
|---|---|---|
| 719,728 | France | Nov. 3, 1931 |